United States Patent Office 3,839,490
Patented Oct. 1, 1974

3,839,490
ISOMERIZATION OF PARAFFIN HYDROCARBONS
Abraham Schneider, Overbrook Hills, Pa., assignor to Sun Research and Development Co., Philadelphia, Pa.
No Drawing. Filed Nov. 24, 1972, Ser. No. 309,040
Int. Cl. C07c 5/28
U.S. Cl. 260—683.76          22 Claims

ABSTRACT OF THE DISCLOSURE

Paraffins ranging from $C_5$ to and including solid paraffins are isomerized by contacting the paraffinic feed in liquid phase, preferably at 10–80° C., with powdered $AlCl_3$ in the presence of a minor amount of saturated halohydrocarbon promoter and in the presence of an adamantanoid suppressor selected from adamantane, alkyladamantanes, diamantane and monoalkyldiamantanes. These adamantanoid suppressors have been found to be highly effective in suppressing undesirable side reactions while allowing the isomerization reaction to proceed. Presence of the halohydrocarbon promoter in small amount is essential. Additional benefits can be obtained by providing a partial pressure of $H_2$ in the reaction zone and/or from the presence of HCl.

CROSS REFERENCE TO RELATED APPLICATION

Copending application of Abraham Schneider and Robert E. Moore, Ser. No. 309,039, filed of even date herewith and entitled "Paraffin Hydrocarbon Isomerization Process," describes and claims the use of adamantanoid suppressors in isomerizing paraffins by means of catalyst systems comprising a combination of $AlCl_3$ with partially dehydrated adsorbents of certain types such as alumina.

BACKGROUND OF THE INVENTION

This invention relates to the isomerization of paraffinic feedstocks by means of an aluminum chloride catalyst at relatively low temperatures. The invention is particularly concerned with the isomerization of paraffins under conditions that provide good isomerization rates while minimizing undesirable side reactions.

There are many disclosures in the prior art relating to the use of aluminum halide catalysts for isomerizing paraffins. The catalyst usually has been used in the form of a preformed aluminum chloride liquid complex which contains excess aluminum chloride dissolved or suspended therein. The liquid complex is contacted with the paraffinic feed as a separate liquid phase to effect isomerization. The effective catalytic component in such case is the excess aluminum chloride in the complex. However there are also numerous references that teach isomerization by means of aluminum halide catalysts in solid form, such as aluminum chloride powder or a combination of aluminum chloride and a carrier material such as alumina.

The main problem in utilizing aluminum chloride catalysts for paraffin isomerizations is to avoid side reactions involving cracking and disproportionation. These reactions tend to destroy the catalytic component due to reaction of the resulting olefinic fragments with aluminum chloride, thereby causing the formation of a complex or sludge which itself is not catalytically active. Besides deactivating the catalyst these reactions reduce the selectivity of the reaction for producing the desired isomerizate product.

In order to suppress side reactions during the aluminum halide isomerization of paraffins the use of naphthenes as suppressors has been proposed in numerous prior art references including the following United States patents:

| Patent No. | Patentee | Issue date |
|---|---|---|
| 2,413,691 | C. C. Crawford et al. | Jan. 7, 1947. |
| 2,434,437 | W. E. Ross | Jan. 13, 1948. |
| 2,438,421 | E. E. Sensel et al. | Mar. 23, 1948. |
| 2,468,746 | B. S. Greensfelder et al. | May 3, 1949. |
| 2,475,358 | R. J. Moore et al. | July 5, 1949. |
| 2,992,285 | F. W. Arey, Jr., et al. | July 11, 1961. |
| 3,280,213 | G. C. Mullen, Jr., et al. | Oct. 18, 1966. |
| 3,285,990 | J. T. Kelly et al. | Nov. 15, 1966. |
| 3,557,479 | D. E. Jost et al. | May 4, 1971. |
| 3,578,725 | D. E. Jost et al. | May 11, 1971. |

The use of naphthenes for this purpose is also discussed by Condon in Catalysis, Vol. 6 (1958), pages 82–98, Reinhold Publishing Corp., and in an article by Evering et al. in Ind. Eng. Chem., 45, No. 3, pages 582–589 (1953). While naphthenes in the reaction mixtures will suppress undesirable side reactions at relatively low temperatures, they also tend to suppress the isomerization rates. If the temperature is increased to expedite the isomerization reaction, the naphthenes themselves then become reactive and form carbonium ions. The latter can cause the paraffin feed to undergo deleterious side reactions. The naphthenic ions also can convert, through loss of protons, to olefinic products which will react with the aluminum chloride to form sludge and destroy the catalyst.

When the paraffinic feed is of the $C_5$–$C_6$ range, naphthenes can be satisfactorily used as suppressors inasmuch as the pentanes and hexanes are not especially prone to undergo cracking and disproportionation reactions. However, when the feed is of the $C_7$ and higher range, or even when it is mainly of the $C_5$–$C_6$ range but contains minor amounts of $C_7$ and/or higher paraffins, the use of naphthenes has not provided a satisfactory solution to the side reaction problem, as these higher paraffins are much more prone to crack and/or disproportionate under conditions that otherwise would provide a reasonable isomerization rate. This circumstance was pointed out by Pines et al., Adv. in Pet. Chem. and Ref., III (1960), page 154, and is still applicable to the prior art. Therein the authors state: "Isomerizing heptanes and higher paraffins has met with little practical success [citations]. Although some isomerization occurs, the bulk of reaction is cracking. Inhibitors effective for pentane and hexane isomerization appear to have little effect with the higher alkanes."

Pat. 2,438,421, cited above, is exemplary of the use of monocyclic naphthenes for suppressing cracking during the isomerization of paraffins having less than seven carbon atoms. Specific examples were carried out with n-pentane at 160° F. (71° C.) and 200° F. (93° C.) employing powdered $AlCl_3$ together with HCl, with a reaction time of 4 hours and both with and without a naphthene suppressor. While the data show that the naphthenes used were effective in suppressing cracking, they also show that the isomerization reaction was quite slow and that the degree of conversion to isopentane was low.

Examples of the isomerization of $C_6$ paraffins in the presence of monocyclic naphthenes are given in above-cited Pats. 3,280,213 and 3,285,990. The processes therein described utilize catalysts prepared by reacting an adsorbent such as alumina with $AlCl_3$ at elevated temperature (200–350° F.) and then with gaseous HCl at lower temperature (180–200° F.). While the latter patent mentions heptane as a feed material, no specific example is given wherein heptane was present.

Pats. 2,468,746 and 2,475,358, also cited above, teach the use of naphthenes as suppressors in the isomerization of higher paraffins. In Pat. 2,468,746 the feed is composed of $C_{10}$–$C_{16}$ n-paraffins and the intended isomerization product is diesel fuel, while in Pat. 2,475,358 the feed is solid paraffin wax which is isomerized to yield oil. Both patents disclose that the naphthene suppressor can be monocyclic, dicyclic or tricyclic, and a number of specific examples of such naphthenes are recited including adamantane. The patentees teach, however, that the catalyst cannot be $AlCl_3$ per se, as in the absence of suppressor it will cause extensive cracking while in the presence of sufficient suppressor to inhibit cracking the isomerization reaction will also be repressed. Consequently, the catalyst is required to be modified in the form of a liquid complex containing excess aluminum chloride. Such complex catalyst and hydrocarbons have little mutual solubility and hence would constitute separate phases within the reaction zone. In order for reaction to occur the hydrocarbon reactant has to diffuse into the liquid complex phase and to the sites of excess aluminum chloride therein, which diffuion necessarily would occur slowly due to the low solubility of paraffin hydrocarbons in the complex. Furthermore, after reaction at the catalyst site has occurred, the resulting isomeric paraffin has to diffuse out of the complex phase to the hydrocarbon phase. The rate of the isomerization reaction is thus limited by mass transfer between the phases. This means that in order to secure reasonable reaction rates intimate mixing of the phases would be required, which necessarily would entail high power costs.

SUMMARY OF THE INVENTION

The present invention provides an improved manner of isomerizing paraffinic hydrocarbons, which is applicable to paraffins ranging from pentane to and including paraffin waxes, and hydrogenated polyethylene. The invention is based on the discovery that, among the many hydrocarbons broadly classifiable as naphthenes, adamantanoid hydrocarbons are unique in their ability to function as suppressors of side reactions during the isomerization. By employing an adamantanoid hydrocarbon suppressor together with a halohydrocarbon promoter as hereinafter described, it has been found that paraffins can be isomerized at good rates by means of powdered $AlCl_3$ as catalyst and with minimal amounts of side reactions.

According to the invention, paraffin hydrocarbons are isomerized by means of solid aluminum chloride catalyst in a process which comprises:

(a) contacting a paraffinic feed substantially free of unsaturated hydrocarbons and having at least five carbon atoms per molecule in liquid phase with $AlCl_3$ in the form of particulate solid at a temperature in the range of −20 to 130° C. and in the presence of a minor amount of saturated halohydrocarbon promoter in which the halogen is chlorine or bromine and also in the presence of a suppressor comprising adamantanoid hydrocarbon selected from the group consisting of adamantane, $C_{11}-C_{20}$ alkyladamantanes having 1–3 alkyl substituents, diamantane and $C_{15}-C_{24}$ monoalkyldiamantane in which the alkyl substituent is attached at a bridgehead position through a primary carbon atom;

(b) continuing said contacting until substantial isomerization of the paraffinic feed has occurred;

(c) and recovering a paraffinic isomerizate from the reaction mixture.

DESCRIPTION

The adamantanoid hydrocarbons employed as suppressors in the present invention include adamantane ($C_{10}$), alkyladamantanes ($C_{11}-C_{20}$) which have 1–10 total alkyl carbon atoms constituting 1–3 alkyl substituents, diamantane ($C_{14}$) and monoalkyldiamantanes ($C_{15}-C_{24}$) in which the alkyl substituent has 1–10 carbon atoms and is attached through a primary carbon atom to a bridgehead position of the nucleus. The nuclei of adamantane and diamantane can be depicted as follows:

  

adamantane            diamantane

As can be seen the adamantane nucleus contains three condensed rings with four bridgehead carbon atoms which are tertiary and equivalent to each other and which are separated from each other by a secondary carbon atom. Diamantane comprises two condensed adamantane nuclei. Unlike the ring systems of non-adamantanoid naphthenes, these structures are unique in that they are incapable of forming an olefinic bond by removal of hydrogen [this being in accordance with Bredt's rule—see "Mechanism and Structure of Organic Chemistry" by Gould (1959), page 348]. The adamantanoid suppressors specified above therefore cannot, in distinction from other kinds of naphthenes, convert under the reaction conditions to olefinic products that can deactivate the aluminum chloride catalyst.

Methods of preparing the adamantanoid hydrocarbons above specified are known in the art. The preparation of adamantane is described, for example, in U.S. Pat. 3,274,274, H. E. Cupery, issued Sept. 20, 1966; and U.S. Pat. 3,489,817, E. C. Capaldi et al., issued Jan. 13, 1970. Numerous references describe the preparation of alkyladamantanes; see, for example, U.S. Pat. 3,128,316, A. Schneider, issued Apr. 7, 1964, and the various references given in U.S. Pat. 3,646,233, R. E. Moore, issued Feb. 29, 1972. The production of diamantane and methyldiamantane is described by T. M. Gund et al., Tetrahedron Letters, No. 4, pp. 3877–3880 (1970) and E. Ōsawa et al., J. Org. Chem., 36, No. 1, pp. 205–207 (1971). Alkyldiamantanes in which the alkyl group is $C_2-C_{10}$ and attached to the nucleus through a primary carbon atom can be made from bromodiamantane by a Grignard type synthesis analogous to that shown in the last-mentioned article for making methyldiamantane.

When alkyladamantanes are used as suppressors in the process of this invention, the suppressor can have one, two or three alkyl substituents on the adamantane nucleus, and it is immaterial whether the substituents are located at bridgehead or non-bridgehead positions or both.

The present process is applicable to a wide range of paraffinic feeds ranging from n-pentane through the gasoline and lubricating oil boiling ranges and including normally solid paraffinic materials such as paraffin waxes and hydrogenated polyethylenes. The feed should be sufficiently free of aromatic and olefinic components so that substantial complexing of the catalyst with such unsaturated components will not occur. The feed can contain monocyclic and dicyclic naphthenes normally associated with the feed paraffins but preferably the content thereof does not exceed 30% by weight.

The process is carried out at a temperature in the range of −20 to 130° C., with temperatures of 10–80° C. usually being preferred. The feed in liquid phase is contacted with powdered $AlCl_3$ at the selected temperature in the presence of an adamantanoid suppressor, as specified above, and also in the presence of a saturated halohydrocarbon promoter as more fully described hereinafter. The promoter is an essential element of the reaction system. An inert halohydrocarbon solvent, e.g. 1,1,2,2-tetrachloroethane, can be used in the mixture, but such solvent is essential only when the paraffin feed is normally a solid material at the selected reaction temperature. However the use of an inert solvent can be beneficial also when the feed is normally liquid, since it will help to keep the $AlCl_3$ catalyst surfaces clean by dissolving any trace amount of catalyst complex that may form and thereby prevent blocking of active catalyst sites. Even without a halohydrocarbon solvent present, however, there is little tendency for the catalyst to form sludge and become deactivated. The presence of the adamantanoid hydrocarbon in the reaction mixture tends to prevent this by immediately combining with any olefinic fragments that may form in small amounts due to side reactions, thus preventing their reaction with the aluminum chloride.

After the liquid phase has been contacted with the powdered $AlCl_3$ long enough to achieve the desired degree of isomerization, contacting is discontinued and the $AlCl_3$ is separated from the bulk of the liquid as by filtration or decantation. Substantially no loss in activity of the catalyst is experienced and the catalyst generally is recovered in clean form without discoloration, indicating the absence of complex. The catalyst can be recycled to the isomerization zone for further use. The liquid phase is distilled to separate the paraffinic isomerizate from the adamantanoid material, and from solvent whenever same has been used, and the adamantanoid hydrocarbon and solvent can also be recycled to the isomerization zone for further use.

As a specific illustration of the invention, a blend of n-pentane (2.0 ml.), 1,1,2,2-tetrachloroethane (2.0 ml.) as solvent, 1,3-dimethyladamantane (1.0 ml.) as suppressor and cyclohexylbromide (25 microliters) as promoter is prepared and is shaken at 50° C. with powdered $AlCl_3$ (1.0 g.) for one hour. This results in the isomerization of the n-pentane to the extent of approximately 60%, without any cracking or disproportionation taking place. No complexing of the catalyst occurs, as indicated by the fact that it remains colorless. During the reaction the bromide moiety of the promoter partly converts to HBr and is partly incorporated through halogen exchange into the aluminum halide. The cyclohexyl group converts to a mixture of cyclohexane and methylcyclopentane.

For convenience hereinafter "DMA" is used to designate 1,3-dimethyladamantane and "TCE" denotes 1,1,2,2-tetrachloroethane.

As another specific illustration, a blend of n-nonane (1.01 ml.), DMA (2.0 ml.) as suppressor, TCE (2.0 ml.) as solvent and 1-bromo-3,5-dimethyladamantane (10 microliters) as promoter is saturated with dry HCl and the mixture is shaken with powered $AlCl_3$ (1.0 g.) at 26° C. for 30 minutes. This results in the conversion of about 60% of the n-nonane to a mixture of branched nonanes and of about 10% to $C_4$–$C_7$ paraffins. The catalyst remains clean and colorless. The composition of the nonane portion of the product is about 25% doubly branched $C_9$ paraffins, 35% singly branched $C_9$ paraffins and 40% n-nonane.

The use of a halohydrocarbon promoter is, as above indicated, an essential feature of the process, although the proportion of promoter required in the reaction mixture is small. The promoter can be any saturated chlorohydrocarbon or bromohydrocarbon which is capable of interchanging halogen for a bridgehead hydrogen of the adamantanoid suppressor in the reaction system. When the halohydrocarbon promoter and the adamantanoid suppressor are brought together in the presence of the $AlCl_3$, such interchange occurs and the resulting haloadamantanoid compound becomes the promoter. Saturated halohydrocarbons which will serve as promoters can be either aliphatic or cycloaliphatic. As a general rule, they have one or more chloro and/or bromo substituents and have at least two carbon atoms with at least one of them having a single halide substituent. Exceptions to this definition are chloroform, carbon tetrachloride and their bromine, analogues which also will function as promoters. Examples of other compounds which will serve as promoters are the following in which the halogen is chlorine or bromine or both: monohaloethane; 1,2-dihaloethane; 1,2,2,2-tetrahaloethane; 1,3-dihalopropane; 1,2,3,3-tetrahalopropane; 1,2,2,3,3,3-hexahalopropane; n- or sec- or t-butyl halide; monohalodecanes; cyclohexyl halide; 1,3-dihalo - 1 - methylcyclopentane; monohalodecalins; monohalonorbornanes; perhydroanthracyl halides; haloadamantanes; halodimethyladamantanes; halodiamantanes; etc.

Various chloroalkanes which in pure form are substantially inert and cannot function as promoters but which can be employed as solvents in the isomerization system are as follows: methyl chloride; methylene chloride; 1,1,2,2-tetrachloroethane (TCE); pentachloroethane (except at elevated temperatures such as 75° C. or higher); and hexachloroethane. The use of such inert solvents in isomerizations effected by means of aluminum halide catalysts is described in Jost et al. Pats. 3,577,479 and 3,578,725 listed above.

Secondary alkyl chlorides are the preferred promoters for use in the system. Examples are isopropyl chloride, 2-chlorobutane and 2- or 3-chloropentane. Primary halides, such as 1-chloropropane, 1-chlorobutane and particularly chloroethane, are less active and preferably are not employed unless reaction temperatures are sufficiently high (e.g. above 25–40° C.). Tertiary halides, such as t-butyl chloride, preferably are used only at low temperatures (e.g. −20 to 10° C.) because they otherwise are so active that they tend to form a complex with the catalyst.

The amount of promoter employed in the reaction mixture is relatively small. The proportion of promoter relative to the paraffin feed component is generally in the range of 0.01–10.0% by volume and typically in the range of 0.1–5.0%. In initiating the reaction the promoter interchanges a halogen atom for a bridgehead hydrogen atom of the adamantanoid suppressor. Thus isopropyl chloride becomes propane, and 2-hexyl chloride converts to hexane which thereafter will isomerize to branched hexanes while the feed paraffin is being isomerized.

The proportion of the adamantanoid suppressor to paraffin in the reaction mixture can vary widely. Benefits from the presence of the suppressor can be noted, for example, with volume ratios of suppressor to paraffin ranging from 3:97 to 90:10. Optimum proportion ranges will vary depending upon the particular paraffinic components of the feed and may also to some extent depending upon the particular adamantanoid hydrocarbon employed as suppressor. Optimum proportions usually fall within the ranges of 20:80 to 80:20 if the feed contains no naphthenes and 7:93 to 80:20 when such naphthenes are present. By way of example, good results are obtainable for $C_5$–$C_6$ paraffinic feed containing no naphthenes at suppressor:paraffin ratios by volume of 20:80 to 50:50, for $C_7$ paraffin at 50:50 to 75:25, and for $C_8$ and higher paraffins at 60:40 to 80:20. Some of the adamantanoid suppressors, e.g. adamantane, diamantane and their monomethyl derivatives, are normally solid compounds at temperatures suitable for the isomerization. However they have substantial solubilities in liquid paraffinic feeds and are generally usable as suppressors even when no inert solvent is employed in the reaction mixture. In cases where it is desired to utilize suppressor to paraffin ratios higher than that corresponding to the solubility of suppressor in the feed at the selected reaction temperature, an inert halohydrocarbon solvent, as previously specified, can be employed to insure solubilization of the suppressor in the amount desired.

For feedstocks containing $C_7$ or higher paraffins it is beneficial to carry out the reaction in the presence of hydrogen chloride or hydrogen or both. This is particularly so for $C_8$ and higher paraffins which tend to crack readily. On the other hand, for $C_5$–$C_6$ paraffins, which are not prone to crack, little if any benefit is obtained from the use of HCl or $H_2$. When cracking does occur to produce olefinic fragments, the presence of HCl and/or $H_2$ in the reaction zone is beneficial in that the olefinic material tends to react with the HCl or $H_2$ or both, and this advantageously prevents it from alkylating the adamantanoid suppressor. Reaction of the olefin with HCl produces alkyl chloride which functions as additional promoter for the isomerization reaction. Reaction with $H_2$ results in the formation of saturate hydrocarbon product that boils below the feed paraffin. In either case alkylation of the suppressor by the olefinic fragments is avoided to the extent that these reactions with HCl or $H_2$ occur. The amount of HCl used can vary widely, the partial pressure thereof in the reaction zone being, for example, in the range of 0.01–100 p.s.i. Hydrogen can be used typically at partial pressures in the range of 20–500 p.s.i., but optimum results usually are obtained in the range of 100–300 p.s.i. If too much hydrogen pressure is employed, the isomerization rate of the feed paraffin will become undesirably slow.

The adamantanoid material recovered from the reaction mixture can, as previously indicated, be recycled to the reaction zone to serve as the suppressor in isomerizing further quantities of feed paraffin. However, since some minor amount of alkylation of the adamantanoid suppressor by olefinic fragments generally occurs, this material may upon continual use eventually become too highly alkylated to function adequately as suppressor of side reactions. It is therefore desirable to provide distillation means for separating the lower boiling adamantanoid hydrocarbons from the more highly alkylated adamantanoid compounds so that only the former can be recycled. If desired the more highly alkylated compounds can be cracked at 300–450° C. in the presence of a conventional cracking catalyst, such as silica-alumina or crystalline zeolites, to remove $C_3$ and higher alkyl substituents in the form of olefins and yield lower adamantanoid hydrocarbons which can be recycled. Such cracking procedure is described in U.S. Pat. No. 3,707,576, issued Dec. 26, 1972, to R. E. Moore. Alternatively the more highly alkylated compounds can be catalytically hydrocracked under a hydrogen pressure and other conditions as described in U.S. Pat. 3,489,817 cited above to yield lower adamantanoid hydrocarbons for reuse. Inasmuch as minor losses of adamantanoid material normally will occur in practicing the process, a supply of the adamantanoid suppressor should be provided to make up for any loss incurred.

Utilization of the present process for isomerizing $C_6$ paraffinic stocks to produce isoparaffin components for gasoline provides an unexpected benefit. It has been found that the content of 2,2-dimethylbutane (2,2-DMB) in the $C_6$ isomerizate product is substantially higher, and the content of singly branched hexanes correspondingly lower, than for $C_6$ isomerizates produced by Friedel-Crafts catalysis to the same percent conversion but in the absence of an adamantanoid suppressor. This is shown, for example, by comparison of the 2,2-DMB content-percent conversion relationship obtained by the present process with that published by Brouwer et al., Div. of Pet. Chem., Am. Chem. Soc., San Francisco Meeting, Ap. 2–5, 1968, pp. 184–192, for a procedure in which n-hexane in the presence of a monocyclic naphthene (methylcyclopentane) and $H_2$ was isomerized by means of $HF-SbF_5$ as catalyst at 50° C. In comparison with the reported results, isomerization of n-hexane at the same temperature but employing powdered $AlCl_3$ in combination with a promoter and DMA as suppressor gives materially higher 2,2-DMB contents at equivalent conversions. The $C_6$ isomerizate of the present process accordingly has better antiknock quality.

The present process can be utilized for making isoparaffinic gasoline components from saturated feeds of the $C_5$–$C_9$ range containing one or more n-paraffin components. It is especially useful for isomerizing feeds of the $C_6$–$C_8$ range containing one or more straight chain and/or singly branched paraffins and particularly those containing at least some $C_7$ or higher paraffins which ordinarily are highly prone to crack in the presence of Friedel-Crafts catalysts.

Various experimental runs performed with a number of paraffin feeds ($C_6$ to $C_{18}$) to demonstrate the invention are given below. These runs were carried out by shaking a mixture of the paraffin, suppressor, promoter, solvent (when used) and powdered $AlCl_3$ in a stoppered bottle or rocker bomb at regulated temperatures and for selected reaction times. In these runs DMA was used as the suppressor and the solvent (when used) was TCE. In most cases isopropyl chloride was employed as the promoter. However, in runs where TCE was used, this solvent contained a small amount of chloroalkane impurity, not specifically identified but thought probably to be 1,2,3-trichloropropane, which functioned as promoter. The amount of this promoter in the solvent was equivalent in promoting effect to 1.35 microliters of isopropyl chloride per ml. of solvent. Consequently, in some runs no additional promoter was added and the solvent impurity served as the promoter. Samples of the hydrocarbon phase of the reaction mixture were taken at various times and analyzed by GLC. Results are shown in the accompanying tables.

TABLE I: RUN 1

Isomerization of normal hexane

Reaction mixture:
2.0 ml. n-hexane
2.0 ml. TCE (solvent)
1.0 ml. DMA (suppressor)
50 microliters n-propyl Cl
0.70 g. $AlCl_3$

| Total reaction time, min | 0 | 140 | 200 | 320 |
|---|---|---|---|---|
| Temp., °C | | 0 | 10 | 10 |
| Composition, wt. percent: | | | | |
| $C_3$ | | Trace | 0.7 | 0.6 |
| i-$C_4$ | | Trace | Trace | 0.4 |
| i-$C_5$ | | | 0.1 | 0.6 |
| n-$C_3$Cl | 0.9 | 1.0 | | |
| 2,2-DMB | | | 0.9 | 7.3 |
| Other branched $C_6$ | | | 6.4 | 11.0 |
| n-$C_6$ | 33.7 | 35.2 | 26.8 | 13.9 |
| Solvent | 48.8 | 47.7 | 48.6 | 49.6 |
| DMA | 16.6 | 15.8 | 15.0 | 15.2 |
| DMA-Cl | | 0.3 | 0.9 | 0.1 |
| $C_4$-DMA | | | | 0.1 |
| $C_5$-DMA | | | | 0.2 |
| $C_6$ | | 0.06 | 0.7 | 0.9 |
| Conversion of n-$C_6$, wt. percent | | 0 | 20.4 | 58.7 |
| $C_4$-$C_5$ products, wt. percent of n-$C_6$ feed | | (¹) | 0.3 | 2.8 |
| 2,2-DMB, wt. percent of $C_6$ products | | | 2.6 | 22.5 |

¹ Nil.

The data of Table I (Run 1) show that at 10° C. the isomerization of n-hexane in the presence of DMA and promoter proceeded, that only a small amount of side reactions occurred, and that the usual harmful effects of olefinic fragments were avoided due to their capture by the DMA suppressor through alkylation forming $C_4$ to $C_6$-substituted DMAs in small amounts. No deterioration of the $AlCl_3$ by complex formation took place, as shown by the fact that no discoloration occurred. The light hydrocarbon products formed ($C_3$–$C_5$) were all paraffins. A total conversion of 58.7% was reached, at which point the 2,2-DMB content of the $C_6$ fraction was 22.5%. By way of comparison, Brouwer et al. (citation above) at the same conversion level obtained only about 10% 2,2-DMB in isomerizing n-hexane at 25° C. with $HF-SbF_5$.

In further comparison, if Run 1 is repeated except that in place of DMA a non-adamantanoid naphthene, e.g. methylcyclohexane, is employed in the same amount, the reaction is so suppressed that substantially no isomerization occurs.

TABLE II: RUN 2
Isomerization of normal heptane

Reaction mixture:
  1.0 ml. n-heptane
  4.0 ml. TCE (solvent)
  2.0 ml. DMA (suppressor)
  3.4 g. AlCl$_3$

| Total reaction time, min | 0 | 66 | 166 | 188 | 248 |
|---|---|---|---|---|---|
| Temp., °C | | 26 | 26 | 26 | 26 |
| Composition, wt. percent: | | | | | |
| C$_3$ | | | | | |
| i-C$_4$ | | 0.05 | 0.10 | 0.20 | 0.28 |
| i-C$_5$ | | | 0.01 | 0.02 | 0.03 |
| i-C$_6$ | | | | Trace | 0.02 |
| Dimethylpentanes | | 1.70 | 2.52 | 3.37 | 3.84 |
| Methylhexanes | | 5.36 | 5.95 | 6.03 | 5.80 |
| n-C$_7$ | 1.2 | 4.96 | 2.88 | 1.77 | 1.15 |
| Solvent | 65.8 | 65.9 | 66.6 | 66.5 | 66.9 |
| DMA | 22.0 | 21.7 | 21.7 | 21.7 | 21.2 |
| C$_3$-DMA | | 0.12 | 0.24 | 0.34 | 0.55 |
| C$_7$-DMA | | 0.24 | 0.10 | 0.09 | 0.11 |
| Conversion of n-C$_7$, wt. percent | | 59.3 | 76.4 | 85.5 | 89.8 |
| C$_4$–C$_6$ products, wt. percent of n-C$_7$ feed | | 0.4 | 0.9 | 1.8 | 2.7 |

Table II shows that DMA at a suppressor:paraffin volume ratio of 2:1 was remarkably effective in suppressing undesirable side reactions while permitting isomerization of n-heptane to occur to a high conversion level. The low amounts of C$_5$–C$_6$ paraffins formed and the absence of C$_5$- and C$_6$-substituted DMAs indicate that disproportionation reactions were practically entirely suppressed. In this run the promoter was the chloroalkane impurity in the solvent, the proportion thereof to n-heptane feed being equivalent to 5.4 microliters of i-propyl chloride per ml.

TABLE II.–A: COMPARATIVE RUN 2-A
Isomerization of normal heptane with methylcyclohexane as suppressor Reaction mixture:
  1.0 ml. n-heptane
  4.0 ml. TCE (solvent)
  2.0 ml. methylcyclohexane (MCH)
  2.2 g. AlCl$_3$

| Total reaction time, min | 0 | 60 | 183 |
|---|---|---|---|
| Temp., °C | | 24 | 24 |
| Composition, wt. percent: | | | |
| Methylhexane | | 0.1 | 0.7 |
| n-Heptane | 12.0 | 12.2 | 11.4 |
| MCH | 23.9 | 21.6 | 22.7 |
| Solvent | 64.1 | 66.0 | 65.2 |

The conditions of Run 2-A were a substantial duplication of those used in Run 2 except that MCH was used as the suppressor in place of DMA. The data in Table II–A show that the isomerization reaction was almost entirely inhibited. If the temperature were raised to say 50° C., the monocyclic naphthene would still largely inhibit the isomerization. On the other hand, if it were raised sufficiently to cause isomerization to proceed at a reasonable rate, the MCH would not be capable of suppressing cracking and disproportionation, and reaction of olefinic products with the AlCl$_3$ would occur, destroying the catalyst.

TABLE III: RUN 3
Isomerization of 50:50 n-hexane and n-heptane

Reaction mixture:
  0.5 ml. n-hexane [1]
  0.5 ml. n-heptane
  2.0 ml. TCE
  2.0 ml. DMA
  10 microliters i-propyl chloride

| Total reaction time, min | 0 | 60 | 120 | 180 | 304 |
|---|---|---|---|---|---|
| Temp., °C | | 25 | 25 | 25 | 25 |
| Composition, wt. percent: | | | | | |
| C$_3$ | | 0.22 | 0.21 | 0.21 | 0.21 |
| i-C$_4$ | | | 0.04 | 0.06 | 0.10 |
| i-C$_5$ | | | Trace | Trace | 0.04 |
| 2,2-DMB | | 0.61 | 1.18 | 1.70 | 2.58 |
| Other branched C$_6$ | | 2.34 | 2.96 | 3.23 | 3.34 |
| n-C$_6$ | 8.7 | 5.14 | 4.18 | 3.08 | 2.10 |
| MCP | 0.5 | | | | |
| Dimethylpentanes [2] | | 1.16 | 1.11 | 1.74 | 2.18 |
| Methylhexanes | | 3.37 | 4.16 | 4.64 | 4.60 |
| n-Heptane | 8.9 | 4.62 | 3.39 | 2.59 | 1.75 |
| Solvent | 49.0 | 49.8 | 49.8 | 49.6 | 49.5 |
| DMA | 32.8 | 32.4 | 32.2 | 32.5 | 32.7 |
| C$_3$-DMA | | | 0.12 | 0.17 | 0.23 |
| C$_6$-DMA | | 0.12 | 0.21 | 0.23 | 0.23 |
| C$_7$-DMA | | 0.24 | 0.35 | 0.35 | 0.45 |
| Conversion of n-C$_6$, wt. percent | | 40.8 | 51.8 | 64.6 | 75.8 |
| Conversion of n-C$_7$, wt. percent | | 48.3 | 62.1 | 71.0 | 80.4 |
| 2,2-DMB, wt. percent of C$_6$ products | | 7.5 | 14.2 | 21.3 | 32.2 |

[1] Contained 5.6% methylcyclopentane (MCP) as impurity.
[2] Probably included cyclohexane.

The data in Table III show that n-hexane and n-heptane in admixture with each other can be isomerized simultaneously in the presence of DMA with only relatively small amounts of side reaction products being formed. No complexing of the catalyst occurred during this reaction and the recovered AlCl$_3$ was essentially unchanged. The content of 2,2-DMB in the C$_6$ fraction of the product was 32.2% at 75.8% conversion of n-hexane. In comparison the 2,2-DMB content shown by Brouwer et al. at the same conversion level was only about 18% for the HF-SbF$_4$ catalyst at 25° C.

TABLE IV: RUN 4
Isomerization of normal undecane

Reaction mixture:
  0.5 ml. n-undecane (C$_{11}$)
  2.0 ml. DMA
  2.0 ml. TCE
  0.85 g. AlCl$_3$

| Total reaction time, min. | 0 | 163 | 223 | 253 |
|---|---|---|---|---|
| Temp., °C | 0 | | 26 | 26 |
| Composition, wt. percent: | | | | |
| i-C$_4$ | | | 0.16 | 0.29 |
| i-C$_5$ | | | 0.36 | 0.53 |
| i-C$_6$ | | | 0.28 | 0.60 |
| i-C$_7$ | | | 0.51 | 0.73 |
| Solvent | 54.9 | | 56.0 | 58.7 |
| Doubly branched C$_{11}$ | | | 1.5 | 1.8 |
| Single branched C$_{11}$ | | | 2.0 | 1.6 |
| n-Undecane | 10.6 | (¹) | 2.5 | 1.6 |
| DMA | 34.5 | | 33.9 | 32.9 |
| C$_4$-DMA | | | 0.68 | 1.10 |
| C$_5$-DMA | | | 0.55 | 0.82 |
| C$_6$-DMA | | | 0.80 | 1.14 |
| C$_7$-DMA | | | 0.53 | 0.79 |
| C$_{11}$-DMA | | | 0.27 | 0.53 |
| Conversion of n-C$_{11}$, wt. percent | | | 76.8 | 84.8 |
| C$_4$–C$_7$ products, wt. percent of n-C$_{11}$ feed | | | 12.4 | 20.3 |

[1] No change.

The results in Table IV show that the isomerization of C$_{11}$ paraffin to high conversions can be effected in the presence of the adamantanoid suppressor without excessive side reactions. While substantial amounts of C$_4$–C$_7$ products were formed, the catalyst remained unaffected and no discoloration of the mixture occurred. In Run 4 as in Run 2, the promoter was the chloroalkane impurity in the solvent, the proportion thereof to paraffin being the same as in Run 2.

TABLE V: RUN 5

Isomerization of normal octadecane

Reaction mixture:
    0.57 g. n-octadecane ($C_{18}$)
    2.0 ml. DMA
    2.0 ml. TCE
    0.84 g. $AlCl_3$
    Dry HCl (to saturation at 0° C. and 1 atmos. press.)

| Total reaction time, min | 0 | 12 | 26 | 152 |
|---|---|---|---|---|
| Temp., °C | | 26 | 26 | 0 |
| Composition, wt. percent: | | | | |
|   $i-C_4$ | | Trace | 0.13 | 0.21 |
|   $i-C_5$ | | Trace | 0.20 | 0.34 |
|   $i-C_6$ | | | 0.16 | 0.23 |
|   $i-C_7$ | | | 0.12 | 0.26 |
|   $i-C_8$ | | | 0.16 | 0.19 |
|   $i-C_9$ | | | 0.08 | 0.05 |
|   Solvent | 52.8 | 52.8 | 54.0 | 53.3 |
|   DMA | 33.9 | 34.0 | 33.1 | 34.4 |
|   DMA-Cl | | 0.17 | 0.22 | 0.30 |
|   $C_4$-DMA | | | 0.34 | 0.66 |
|   $C_5$-DMA | | | 0.24 | 0.46 |
|   Triply branched $C_{18}$ | | 0.26 | 1.71 | 2.05 |
|   Doubly branched $C_{18}$ | | 1.51 | 2.84 | 2.56 |
|   Singly branched $C_{18}$ | | 3.12 | 3.27 | 2.50 |
|   $n-C_{18}$ | 13.3 | 8.1 | 3.5 | 2.40 |
| Conversion of $n-C_{18}$, wt. percent | | 39.5 | 74.0 | 81.8 |
| $C_4$-$C_9$ products, wt. percent of $n-C_{18}$ feed | | (¹) | 6.4 | 9.6 |

¹ Nil.

The data in Table V illustrate the fact that normally solid paraffins can be successfully isomerized to high conversion levels in the presence of an adamantanoid suppressor and without inordinately high proportions of cracking products being made. In other words solid paraffins can be converted in good yields to saturated lubricating oils in this manner. In Run 5 the promoter again was supplied by the chcloroalkane impurity in the TCE solvent.

Table VI presents four runs on isomerizing n-heptane in the presence of DMA. In Runs 6 and 7 no chloroalkane promoter was employed, while in Runs 8 and 9 isopropyl chloride was utilized as promoter. In Run 7 the reaction mixture was initially saturated with dry HCl.

The data in Table VI show that the presence of a promoter is necessary for the isomerization to proceed at suitable rates. Run 7 shows that HCl per se will not function as promoter. Run 8 shows that with a chloroalkane promoter present an inert chlorohydrocarbon solvent is not essential for practicing the invention. Run 9 shows that n-heptane can be isomerized to high conversion levels by the present process without excessive amounts of lower boiling products being formed. In all of these runs no discoloration or deterioration of the catalyst occurred.

TABLE VI: RUNS 6-9

Isomerization of n-heptane in presence of DMA

| | Run 6 | Run 7 | Run 8 | Run 9 | | |
|---|---|---|---|---|---|---|
| Solvent (TCE) used | No | No | No | Yes | | |
| Ml. TCE/ml. of $n-C_7$ | | | | 4 | | |
| Promoter used | None | None | i-Propyl Cl | i-Propyl Cl | | |
| Microliters/ml. of $n-C_7$ | | | 10 | 20 | | |
| HCl used | No | Yes* | No | No | | |
| Wt. ratio of DMA:$n-C_7$ | 64:36 | 64:36 | 65:35 | 51:49 | | |
| G. $AlCl_3$/ml. of $n-C_7$ | 0.33 | | 0.31 | 0.98 | | 0.94 |
| Total reaction time, hrs | 1.0 | 3.0 | 1.0 | 1.0 | 3.0 | 0.5 | 1 |
| Temp., °C | 50 | 50 | 25 | 26 | 26 | 24 | 24 |
| Conversion of $n-C_7$, wt. percent | 0.5 | 2.2 | 0 | 33.4 | 59.8 | 71.5 | 84.4 |
| $C_4$-$C_7$ products, wt. percent of $n-C_7$ feed | 0 | 0 | 0 | Trace | 0.6 | 3.1 | 7.2 |

* Reaction mixture saturated with dry HCl at 1 atmos. press. and 25° C.

TABLE VII: RUNS 10-14

Isomerization of n-octane at various $H_2$ pressures

Reaction mixture:
    1.0 ml. n-octane (11.8 wt. percent of organic phase)
    2.0 ml. DMA
    4.0 ml. TCE
    $AlCl_3$ and HCl (as listed)
Reaction temp.: 26° C.

| | Run 10 | | Run 11 | Run 12 | Run 13 | Run 14 |
|---|---|---|---|---|---|---|
| G. $AlCl_3$ | 1.12 | | 0.89 | 0.89 | 1.09 | 0.91 |
| $H_2$ partial press., p.s.i | 0 | | 100 | 193 | 201 | 298 |
| HCl partial press., p.s.i | (¹) | | 10 | 10 | 10 | 10 |
| Total reaction time, min | 60 | 90 | 120 | 120 | 240 | 120 |
| Composition, wt. percent: | | | | | | |
|   $C_4$-$C_7$ paraffins | 1.82 | 2.87 | 2.91 | 0.23 | 2.63 | Trace |
|   Dimethylhexanes | 2.51 | 1.94 | 2.81 | 1.21 | 3.13 | 0.27 |
|   Methylheptanes | 3.34 | 1.66 | 2.91 | 3.31 | 3.41 | 1.87 |
|   $n-C_8$ | 2.95 | 0.65 | 1.63 | 7.06 | 2.07 | 10.10 |
|   Solvent | 67.5 | 68.3 | 67.4 | 66.5 | 66.8 | 65.9 |
|   DMA | 19.4 | 17.5 | 20.0 | 21.8 | 20.9 | 21.8 |
|   Alkylated DMAs | 1.41 | 5.08 | 2.35 | 0 | 1.06 | 0 |
| Conversion of $n-C_8$, wt. percent | 74.8 | 94.5 | 86.2 | 40.1 | 82.4 | 14.1 |
| $C_4$-$C_7$ paraffins, wt. percent $n-C_8$ feed | 15.4 | 24.4 | 24.7 | 2.0 | 22.3 | (²) |
| Isooctanes, wt. percent of $n-C_8$ feed | 49.7 | 30.5 | 48.6 | 38.4 | 55.5 | 18.2 |
| Consumption of $H_2$, Δ p.s.i | | | 2.5 | 1 | 8 | 1 |

¹ Reaction mixture saturated with HCl at 0° C. and 1 atmos. press.
² Nil.

Table VII presents data from comparative runs on isomerizing n-octane at 26 C. at various $H_2$ partial pressures ranging from 0 to about 300 p.s.i. The results show that the use of hydrogen pressure in the reaction zone can be beneficial and indicate that optimum results for reaction at 26° C. are obtained at a hydrogen partial pressure in the neighborhood of 200 p.s.i. The effect of the hydrogen is to allow the conversion of n-octane to be carried further without excessive alkylation of the adamantanoid suppressor, whereby higher yields of isooctanes and higher contents of doubly branched $C_8$ hydrocarbons in the isooctane fraction can be secured. Run 14 shows that at 26° C. a partial pressure of $H_2$ as high as about 300 p.s.i. retards the reaction rate too greatly; but this could be compensated for by raising the temperature level and still securing benefits from the presence of $H_2$.

When other adamantanoid hydrocarbons as herein specified are used in place of DMA as suppressor, substantially similar results are obtained although some differences in suppressing action may be noted for different adamantanoid compounds. The degree of suppression under a given set of reaction conditions generally tends to decrease as the degree of alkylation of the adamantanoid nucleus increases. Thus adamantane and diamantane usually exhibit the strongest suppressing actions, so that lower amounts of these in solution generally will exert equivalent suppressing actions to higher amounts of alkyladamantanes. However, for convenience in material handling in the present process, it can be preferable to employ a normally liquid suppressor, such as DMA, rather than one that is normally solid such as adamantane and diamantane and to utilize a somewhat larger proportion of the normally liquid suppressor in order to obtain an equivalent suppressing action. Suppressors generally preferred are the $C_{11}$–$C_{14}$ alkyladamantanes having 1–3 alkyl substituents of the $C_1$–$C_2$ range, examples being methyladamantane, dimethyladamantane, ethyladamantane, ethylmethyladamantane, trimethyladamantane, ethyldimethyladamantane and mixture of two or more of same.

When other non-inert saturated chlorohydrocarbons or bromohydrocarbons, as previously described, are used in place of the alkyl chlorides shown in the foregoing examples as promoters, substantially analogous results are obtained. It is generally preferable, however, to use a chlorohydrocarbon rather than a bromohydrocarbon in order to avoid a bromine-chlorine interchange reaction with the powdered $AlCl_3$.

The invention claimed is:

1. Process for isomerizing paraffins by means of solid aluminum chloride catalyst which comprises:
   (a) contacting a paraffinic feed substantially free of unsaturated hydrocarbons and having at least five carbon atoms per molecule in liquid phase with $AlCl_3$ in the form of particulate solid at a temperature in the range of —20 to 130° C. and in the presence of a minor amount of saturated halohydrocarbon promoter in which the halogen is chlorine or bromine and also in the presence of a suppressor comprising adamantanoid hydrocarbon selected from the group consisting of adamantane, $C_{11}$–$C_{20}$ alkyladamantanes having 1–3 alkyl substituents, diamantane and $C_{15}$–$C_{24}$ monoalkyldiamantane in which the alkyl substituent is attached at a bridgehead position through a primary carbon atom said promoter being capable of interchanging said halogen for a bridgehead hydrogen of said suppressor;
   (b) continuing said contacting until substantial isomerization of the paraffinic feed has occurred;
   (c) and recovering a paraffinic isomerizate from the reaction mixture.

2. Process according to Claim 1 wherein said suppressor is adamantane.

3. Process according to Claim 2 wherein said promoter is a secondary alkyl chloride.

4. Process according to Claim 1 wherein said feed comprises n-paraffin of the $C_5$–$C_9$ range.

5. Process according to Claim 4 wherein said promoter is a saturated hydrocarbyl chloride and said temperature is in the range of 10–80° C.

6. Process according to Claim 1 wherein said promoter is a chloroalkane or a bridgehead chloride of said adamantanoid hydrocarbon.

7. Process according to Claim 6 wherein said promoter is a secondary alkyl chloride.

8. Process according to Claim 1 wherein said feed is of the $C_6$–$C_7$ range and comprises n-heptane.

9. Process according to Claim 1 wherein said feed contains a $C_7$ or higher paraffin and said contacting is effected in the presence of $H_2$ at a partial pressure below 500 p.s.i.

10. Process according to Claim 9 wherein the $H_2$ partial pressure is in the range of 100–300 p.s.i.

11. Process for isomerizing paraffins by means of solid aluminum chloride catalyst which comprises:
    (a) contacting a paraffinic feed substantially free of unsaturated hydrocarbons and having at least five carbon atoms per molecule in liquid phase with $AlCl_3$ in the form of particulate solid at a temperature in the range of —20 to 130° C. and in the presence of a minor amount of saturated halohydrocarbon promoter in which the halogen is chlorine or bromine and also in the presence of a suppressor comprising adamantanoid hydrocarbon selected from the group consisting of $C_{11}$–$C_{20}$ alkyladamantanes having 1–3 alkyl substituents, diamantane and $C_{15}$–$C_{24}$ monoalkyldiamantane in which the alkyl substituent is attached at a bridgehead position through a primary carbon atoms;
    (b) continuing said contacting until substantial isomerization of the paraffinic feed has occurred;
    (c) and recovering a paraffinic isomerizate from the reaction mixture.

12. Process according to Claim 11 wherein said suppressor is $C_{11}$–$C_{14}$ alkyladamantane having 1–3 alkyl substituents of the $C_1$–$C_2$ range.

13. Process according to Claim 12 wherein said suppressor is dimethyladamantane.

14. Process according to Claim 12 wherein said promoter is a secondary alkyl chloride.

15. Process according to Claim 11 wherein said suppressor is $C_{11}$–$C_{14}$ alkyladamantane having 1–3 alkyl substituents of the $C_1$–$C_2$ range, said promoter is a saturated hydrocarbyl chloride and said temperature is in the range of 10–80° C. and said feed comprises n-paraffin of the $C_5$–$C_9$ range.

16. Process according to Claim 9 wherein said suppressor is dimethyladamantane.

17. Process according to Claim 11 wherein said feed mainly comprises one or more paraffins of the $C_6$–$C_8$ range which are straight chain or singly branched, said temperature is in the range of 10–80° C., said promoter is a saturated hydrocarbyl chloride, and said suppressor is methyladamantane, dimethyladamantane, ethyladamantane, ethylmethyladamantane, trimethyladamantane, ethyldimethyladamantane or a mixture of two or more of same.

18. Process according to Claim 17 wherein said suppressor is dimethyladamantane.

19. Process according to Claim 11 wherein said promoter is a bridgehead chloride of a $C_{11}$–$C_{14}$ alkyladamantane.

20. Process for isomerizing $C_6$ paraffin hydrocarbons which comprises:
    (a) establishing a hydrocarbon mixture substantially free of unsaturated hydrocarbons and containing essentially (1) $C_6$ paraffin having less than two branches and (2) an adamantanoid hydrocarbon suppressor selected from the group consisting of adamantane, $C_{11}$–$C_{20}$ alkyladamantanes having 1–3 alkyl substituents, diamantane and $C_{15}$–$C_{24}$ monoalkyldiatane in which the alkyl substituent is attached at a bridgehead position through a primary carbon atom, the volume ratio of said adamantanoid hydrocarbon suppressor to $C_6$ paraffin being in the range of 3:97 to 90:10;

(b) contacting said mixture under isomerizing conditions with a solid aluminum chloride catalyst at a temperature in the range of −20 to 130° C. in the presence of a minor amount of saturated halohydrocarbon promoter in which the halogen is chlorine or bromine said promoter being capable of interchanging said halogen for a bridgehead hydrogen of said suppressor;

(c) and recovering from the reaction mixture a $C_6$ paraffinic isomerizate containing 2,2-dimethylbutane.

21. Process for isomerizing $C_6$ paraffin hydrocarbons which comprises:

(a) establishing a hydrocarbon mixture substantially free of unsaturated hydrocarbons and containing essentially (1) $C_6$ paraffin having less than two branches and (2) an adamantanoid hydrocarbon suppressor selected from the group consisting of $C_{11}$–$C_{20}$ alkyladamantanes having 1–3 alkyl substituents, diamantane and $C_{15}$–$C_{24}$ monoalkyldiamantane in which the alkyl substituent is attached at a bridgehead position through a primary carbon atom, the volume ratio of said adamantanoid hydrocarbon suppressor to $C_6$ paraffin being in the range of 3:97 to 90:10;

(b) contacting said mixture under isomerizing conditions with a solid aluminum chloride catalyst at a temperature in the range of −20 to 130° C. in the presence of a minor amount of saturated halohydrocarbon promoter in which the halogen is chlorine or bromine;

(c) and recovering from the reaction mixture a $C_6$ paraffinic isomerizate containing 2,2-dimethylbutane.

22. Process according to Claim 21 wherein said volume ratio of suppressor to $C_6$ paraffin is in the range of 20:80 to 80:20.

References Cited

UNITED STATES PATENTS

| | | | |
|---|---|---|---|
| 3,523,072 | 8/1970 | Schneider | 260—683.76 |
| 2,475,358 | 7/1949 | Moore et al. | 260—683.76 |
| 2,468,746 | 5/1949 | Greensfelder et al. | 260—683.76 |
| 3,671,598 | 6/1972 | Moore | 260—666 P |

DELBERT E. GANTZ, Primary Examiner

G. J. CRASANAKIS, Assistant Examiner